Figure 1:
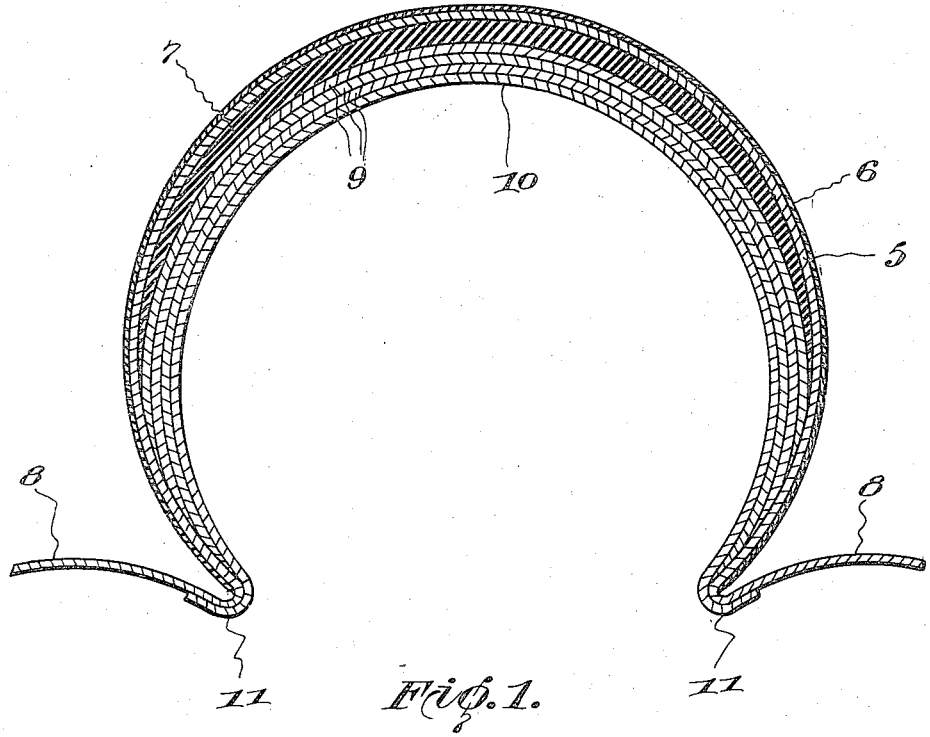

Nov. 4, 1924.

D. E. SWARTZ

TIRE BOOT

Filed Oct. 21, 1922

1,513,770

Inventor:
David E. Swartz.

By Milo B. Stevens & Co.

Attorneys.

Patented Nov. 4, 1924.

1,513,770

UNITED STATES PATENT OFFICE.

DAVID E. SWARTZ, OF CHICAGO, ILLINOIS, ASSIGNOR TO SWARTZ BROTHERS, OF CHICAGO, ILLINOIS, A COPARTNERSHIP COMPOSED OF: DAVID E. SWARTZ, FREDERICK J. SWARTZ, ALBERT J. SWARTZ, AND JOHN J. SWARTZ.

TIRE BOOT.

Application filed October 21, 1923. Serial No. 586,039.

*To all whom it may concern:*

Be it known that I, DAVID E. SWARTZ, a citizen of the United States, residing at Chicago, in the county of Cook and State of Illinois, have invented new and useful Improvements in Tire Boots, of which the following is a specification.

My invention relates to new and useful improvements in tire boots, and more particularly to a tire boot, of this character adapted to be employed in connection with pneumatic tires for strengthening the tire casing at a point where a blow-out has occurred.

The primary object of the invention is the provision of a boot of the kind stated, the outer surface of which is adapted to adhere to the inner lining of the tire casing when in use, thus preventing any relative movement between the boot and casing.

Another important object of my invention is to provide a tire boot of this kind, having a rubber reinforcing layer adjacent its outer surface to act as a wearing tread and to seal the hole in the casing against the entry of stones or other foreign matter as the tire is run over the road.

The invention also has for an object to furnish a tire boot which will perform the function of a vulcanized section in the outer casing, and which will be strong and durable.

The above and other objects are attained by means of certain novel features of construction and arrangement of the various parts to be hereinafter described and claimed, and in order that the same may be better understood, reference is had to the accompanying drawings forming a part of this specification.

Figure 2:
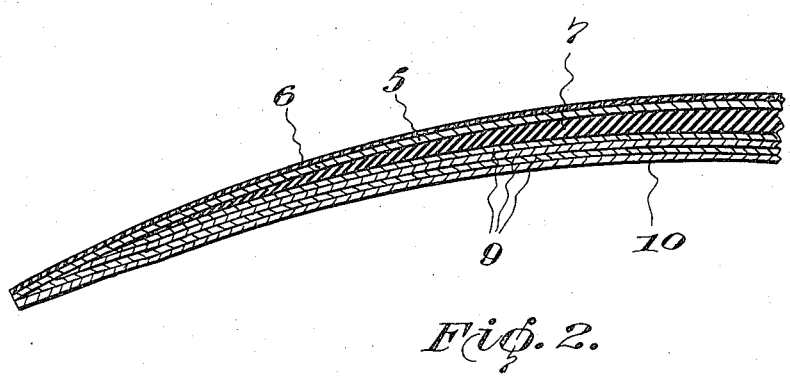

In the drawing,

Figure 1 is a transverse section through a tire boot constructed in accordance with my invention, and Fig. 2 is a fragmental longitudinal sectional view.

Referring specifically to the drawing, wherein the preferred embodiment of the invention is shown, numeral 5 denotes the outer covering of the boot consisting of a ply of extra strong fabric which is double rubber frictioned at its outer surface, the first being a standard calendered friction while the second is of crude rubber 6 which is applied after the boot is formed. The outer ply 5 is preferably of a rather coarse weave to receive the rubber in its pores to insure better adhesion to the inner surface of the tire casing. The inner surface of the fabric ply 5 is single calendered rubber frictioned to adhere to the outer surface of a thick layer of rubber 7 forming the tread portion of the boot and extending substantially throughout the length thereof with its side and end edges tapered very thin so as to conform to the inside of the tire casing.

The outer fabric covering 5 is extended beyond the edges of the boot to form the lateral extensions or flaps for insertion between the bead of the tire casing and the rim for the proper locating of the boot at the desired point in the casing.

Beneath the rubber layer 7 are three plies of standard regulation tire fabric 9, all suitably frictioned so that they will adhere to each other and to the layer of rubber 7 to form a practically solid mass of rubber and fabric.

A lining 10 is provided to cover all the inner surface of the boot, it having lateral extensions 11 to reinforce the flaps 8 at their wearing points between the tire and the rim of the wheel. The upper surface of this lining is also rubber frictioned to adhere to the lowermost fabric ply 9 while the inner surface is smooth and unfrictioned to prevent injury to the inner tube of the tire. All plies of fabric used in the construction of the boot are cut on a forty-five degree bias so that they will conform to the construction of the tire itself, to prevent friction between the tire and boot and to insure its adhesion to the inside of the tire casing as a part of it. As will be noted, the rubber layer 7 and the fabric plies are all cut to a size and skived to form a perfectly fitting boot, all edges being tapered thin so as to prevent injury to the inner tube.

From the foregoing description, read in connection with the accompanying drawing, the formation and advantages of my boot will be readily appreciated. It may be applied to the inside of a casing in the same manner as the conventional boot now in use, the flaps 8 being allowed to stick out between the bead and the rim. When the tire is inflated and run on the road the heat generated thereby will cause the melting of the rubber 6 which results in the self vulcanization of the boot to the inside of the casing. When the outer fabric ply has worn through the portion of the rubber boot tread 7 will act as a plug for the hole in the casing to keep out stones, etc. The rubber layer 7 will be proportionately large enough to cover the surface around any blow-out hole or holes that might occur within the radius of a forty-five degree angle assuming the apex to be at the center of the rim. No metallic stiffening means are necessary, the rubber layer serving to prevent the boot from being forced through a break in the casing when the tire is inflated.

After my tire boot has become vulcanized to the inside of the tire casing hereinbefore described, it serves to maintain the normal contour of the portion of the casing walls it covers, and prevents bulging or expanding thereof from the pressure of the air within.

Particular attention is directed to Fig. 1 which plainly illustrates that the longitudinal edge portions of each and every lamination are attached to the cover 5 so that one lamination is prevented from slipping with relation to an adjacent lamination or with relation to any other part of the boot.

Attention is also directed to the fact that the longitudinal edge portions of the lining 10 are extended outwardly and are attached to the flaps 8 to strengthen and reinforce the same and to form a more or less of a seal at each side of the boot by means of which any lamination is prevented from working its way out of place.

In accordance with the patent statutes, I have described the preferred embodiment of my invention, but it will be understood that I do not propose to limit myself strictly thereto, since various changes and modifications will immediately suggest themselves to those skilled in the art within the spirit of the invention, the scope of which is set forth in the following claims.

Having thus described my invention, what I claim as new and desire to secure by Letters Patent is:

1. A tire repair boot comprising a body having a plurality of laminations of different widths, a tread portion of rubber attached to the outer lamination of the body and being narrower than the same, a covering extending over the rubber tread portion and being substantially wider than the tread portion, said cover being secured to the longitudinal edge portions of all the laminations of said body and having its own longitudinal edge portions extending beyond said laminations and outwardly to form attach flaps, and a lining attached to the innermost lamination of the body and having its edge portions extended outwardly beyond the edges of said laminations and attached to said flaps to strengthen the same and to hold the laminations constituting said body firmly in place.

2. The construction set forth in claim 1, the rubber tread portion being adapted to work its way partly into the tire cover to fill the opening.

In testimony whereof I affix my signature.

DAVID E. SWARTZ.